United States Patent
Buchheit

(10) Patent No.: US 9,531,655 B1
(45) Date of Patent: Dec. 27, 2016

(54) ENABLING A SOCIAL NETWORKING PRE-SUBMISSION FILTERING

(71) Applicant: Brian K. Buchheit, Davie, FL (US)

(72) Inventor: Brian K. Buchheit, Davie, FL (US)

(*) Notice: Subject to any disclaimer, the term of this patent is extended or adjusted under 35 U.S.C. 154(b) by 96 days.

(21) Appl. No.: 14/229,149

(22) Filed: Mar. 28, 2014

Related U.S. Application Data

(63) Continuation-in-part of application No. 14/150,351, filed on Jan. 8, 2014.

(60) Provisional application No. 61/806,026, filed on Mar. 28, 2013.

(51) Int. Cl.
  *G06N 5/02* (2006.01)
  *H04L 12/58* (2006.01)
  *G06F 17/30* (2006.01)

(52) U.S. Cl.
  CPC ......... *H04L 51/12* (2013.01); *G06F 17/30861* (2013.01); *H04L 51/32* (2013.01); *G06N 5/02* (2013.01)

(58) Field of Classification Search
  None
  See application file for complete search history.

(56) References Cited

PUBLICATIONS

Hankinson, Child psychopathology, parental problem perception, and help-seeking behaviors, Doctoral Thesis, University of South Florida, 2009, pp. 1-97.*
Free Software Foundation, Inc., Floss Manuals, 2009, pp. 1-189.*

* cited by examiner

*Primary Examiner* — Wilbert L Starks
(74) *Attorney, Agent, or Firm* — Patents on Demand P.A.; Brian K. Buchheit; Scott M. Garrett

(57) ABSTRACT

A content for a message to be submitted to a social networking account of a person can be received. The message can be submitted and the content can be shared with other persons via the social network. Prior to conveying, submitting, and/or storing, the message can be scored in one or more dimensions. The dimensions can represent aspects of a reputation of the person. Previously established threshold scores for each of the dimensions can be determined. When the content is outside an established allowance range of the scores, performing a programmatic action to ensure that the submission of the message does not automatically occur to the account. When the content is not outside the scores, not taking a programmatic action to prevent the submission of the message and instead permitting the submission of the message to automatically occur to the account.

20 Claims, 9 Drawing Sheets

Scenario 710

ENABLING A SOCIAL NETWORKING PRE-SUBMISSION FILTERING

CROSS-REFERENCE TO RELATED APPLICATIONS

This utility application converts and claims the benefit of U.S. Provisional Patent Application No. 61/806,026, filed 28 Mar. 2013. The entire contents of U.S. Application No. 61/806,026 are incorporated by reference herein.

The utility application also claims priority (and is a continuation in part of) U.S. patent application Ser. No. 14/150,351 titled "Improved Social Interactive Intelligence Exhibited by Machines/Programs During Human-Machine Interactions Using Life State Values" filed Jan. 8, 2014, which claimed priority to US Provisional 61/750,053 filed 8 Jan. 2013 and US Provisional 61/773,515 filed 6 Mar. 2013. The entire contents of application Ser. Nos. 14/150,351; 61/750,053; and 61/773,515 are incorporated by reference herein.

BACKGROUND

The present invention relates to the field of social network filtering and, more particularly, to enabling a social networking pre-submission filtering.

With the growing desire to be constantly connected, devices and applications are available which let people share ideas instantly with friends or the general public. For example, mobile phones permit multiple ways to share content which can include images, video and text messages. Multiple avenues of communication can be advantageous in many instances, permitting people to connect with others in a variety of ways. For example, friends and family can stay current with each other through FACEBOOK feed posts (e.g., timeline), instant messaging, and TWITTER photo tweets.

However, with the advent of instant communication, many problems arise especially when inappropriate content is inadvertently shared. When inappropriate content such as offensive images and controversial statements is shared by a person, the content can often damage the reputation of the person sharing the content. That is, often times persons share content which they later discover negatively impacts their reputation. For example, drunk texting is a common form of communication in which a person texts another person one or more inappropriate messages which subsequently results in a negative outcome. This can be especially damaging to persons of notoriety such as celebrities and/or socialites which can irreparably destroy their public image. As such, it is desirable to leverage existing technologies to assist in conducting communication with limited negative outcomes.

BRIEF SUMMARY

One aspect of the present invention can include an apparatus, a computer program product, a system, and a method for enabling a social networking pre-submission filtering. A content for a message to be submitted to a social networking account of a person can be received. The message can be submitted and the content can be shared with other persons via the social network. Prior to conveying, submitting, and/or storing, the message can be scored in one or more dimensions. The dimensions can represent aspects of a reputation of the person. Previously established threshold scores for each of the dimensions can be determined. When the content is outside an established allowance range of the scores, performing a programmatic action to ensure that the submission of the message does not automatically occur to the account. When the content is not outside the scores, not taking a programmatic action to prevent the submission of the message and instead permitting the submission of the message to automatically occur to the account.

Another aspect of the present invention can include an apparatus, a method, a computer program product, a method, and a system for enabling a social networking pre-submission filtering. A filtering engine can be configured to filter a message content to be conveyed to a social networking account of a person prior to submission the account. The engine can analyze the content based on a previously established dimensions. The engine can generate a score for each of the established dimensions. The engine can evaluate the score against a previously established threshold corresponding to the dimension. When the score is less than or more than the threshold, the engine can prompt for manual approval of the content before conveying the content to the account. A data store can be able to persist a pre-submission filter, a user profile including a reputation information, and the message content.

Yet another aspect of the present invention can include an apparatus, a system, a computer program product, and a method for enabling a social networking pre-submission filtering. Messages of a user account of a social networking site can be received. The messages can be shared with others via the social networking site. A delay time period can be permitted before submitting the message. The delay time period can permit a user to change their mind about submitting specific content associated with the message to the social networking site. Before the delay time period, the user can be permitted to withdraw and/or edit content in the message. After the delay time period, the degree that the user can withdraw and/or edit the content of the message can be minimized. A greater latitude in withdrawing and/or editing content can be given to the user during the delay period than after.

DETAILED DESCRIPTION

Figure 1:
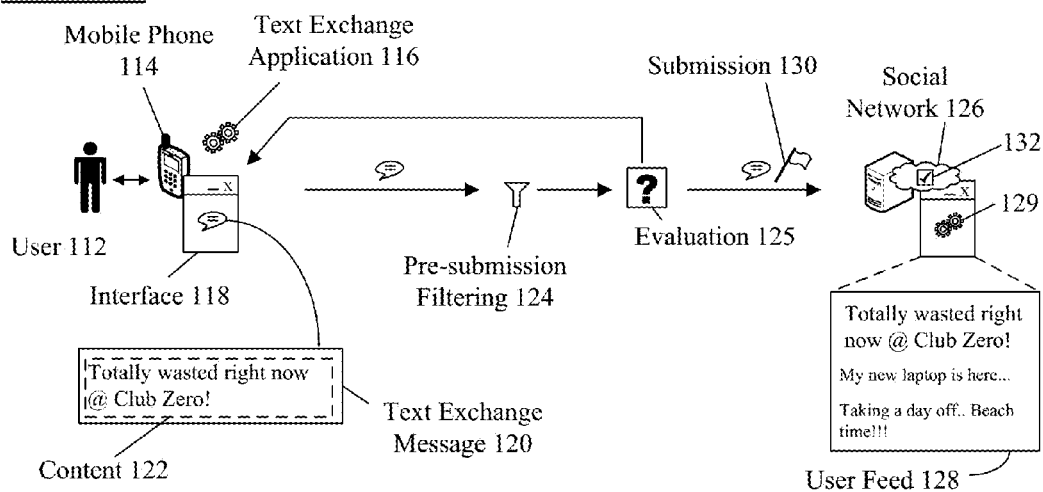
FIG. 1 is a schematic diagram illustrating a scenario and an interface sequence for enabling a social networking pre-submission filtering in accordance with an embodiment of the inventive arrangements disclosed herein.
Figure 1:
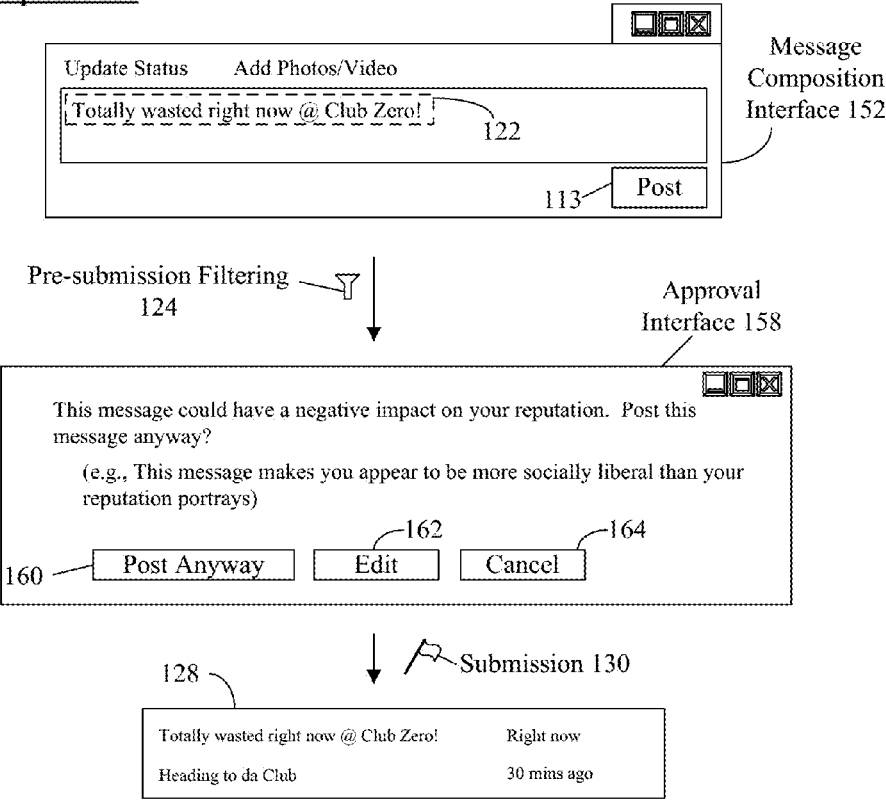

The present disclosure is a solution for enabling a social network pre-submission filtering. In the solution, a filter can be established that is utilized to receive submissions directed to a social networking Web site. In one instance, the filter can be applied before the submission (e.g., content, information) is conveyed/posted/stored on the social networking Web site. In one configuration of the instance, the filter can be utilized to prompt a user associated with the submission for manual approval before the submission is conveyed/posted/stored on the social networking Website. In one embodiment, the service can be an "identity protector" or an "reputation protector" designed to ensure a person does not post information likely to damage their public image or reputation. In another embodiment, the filter can be utilized to prevent submissions of an underage person from submitting content/information deemed dangerous to the submitter's reputation or health.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic diagram illustrating a scenario 110 and an interface sequence 150 for enabling a social networking pre-submission filtering in accordance with an embodiment of the inventive arrangements disclosed herein.

Scenario 110, 150 can be present in the context of scenario 210, 310, 410, 710, system 600, method 600.

As used herein, a text exchange message 120 can be a real-time or near real-time electronic message composed and/or conveyed within a computing device. Message 120 can include, but is not limited to, content 122, metadata (e.g., formatting data), control information (e.g., header), and the like. Message 120 can include, but is not limited to, instant messages, Short Message Service messages, electronic mail, Web site post, forum post, and the like. Content 122 can include, but is not limited to, a text, a video, an image, and the like.

As used herein, a social network 126 can be an online community of groups and/or individuals organized into one or more traditional and/or proprietary social networks. For example, social network can be a social network associated with a YOUTUBE video site. It should be appreciated that social network 126 can include a social networking Web site (e.g., 129), a user feed 128, a user account, and the like. It should be appreciated that the disclosure is not limited to traditional social networks and can be extended to temporary social organizations (e.g., video conferencing with text chat), whiteboard collaborations, real-time chat rooms, and the like.

A virtual community can be a social network of individuals who interact through specific social media, potentially crossing geographical and political boundaries in order to pursue mutual interests or goals. One of the most pervasive types of virtual community operate under social networking services consisting of various online communities.

In one instance, user 112 presence within social network 126 Web site 129 can be linked with behavioral characteristics which can represent a reputation 132 associated with the user 112. Reputation 132 can be an opinion about user 112, typically a result of social evaluation on a set of criteria which can include, but is not limited to, business reputation, financial reputation, social reputation, sexual reputation, and the like. In one instance, reputation 132 can be determined based on an online interaction (e.g., interactions with other people in an online community), from a real life reputation, and the like. In one instance, a profile (e.g., social profile 551) associated with an account of user 112 within a social network 126 can be utilized to explicitly represent a person's reputation (e.g., or identity). In the instance, the profile can define one or more characteristics of an online reputation within one or more online communities.

Scenario 110 can present a logic flow associated with the pre-submission filtering functionality of the disclosure. Interface sequence 150 can correspond to the logic flow and can present one or more interfaces associated with the logic flow. For example, message composition interface 152 can correspond to interface 118 and approval interface 158 can be presented in the context of evaluation 125.

In scenario 110, a user 112 interacting with a text exchange application executing on a mobile phone 114 can compose a text exchange message 120. For example, user 112 can use a message composition interface 152 (e.g. a screen of interface 118) to compose content 122. Text exchange message 120 can include a text content 122 and/or a multimedia content which can be conveyed to a social network 126. For example, user 112 can compose an "update status" to submit (e.g., Post button 113) to their FACEBOOK feed indicating they are considerably inebriated at a venue. In one embodiment, a pre-submission filtering 124 can be performed on the message 120. The pre-submission filtering 124 can perform evaluation 125 which can determine if message 120 aligns with user 112's reputation and/or personality on social network 126. For example, an approval interface 158 can be presented indicating the message can negatively impact the user's reputation if the message is posted to their user feed on TWITTER. That is, if the content 122 makes the user appear more socially liberal than their reputation indicates, the approval interface 158 can be presented. In the embodiment, if the message 120 does not conform to a user's reputation, a manual authorization can be presented to assist the user 112 in reconsidering the message 120 submission. For example, interface 158 can permit the user 112 to edit (e.g., edit button 162) the message 120 to tone down the content 122 of message 120 prior to posting. In one embodiment, approval interface 158 can permit user to cancel message 120 resulting in message 120 deletion.

In one instance, submission 130 of the message can be performed upon approval 160 (e.g., selection of "Post Anyway" interface element). In the instance, submission 130 can convey message 120 to social network 126 permitting content 122 to appear on user's feed 128. That is, pre-submission filtering 124 can be performed prior to conveyance to network 126, enabling privacy to be maintained.

Drawings presented herein are for illustrative purposes only and should not be construed to limit the invention in any regard. In one embodiment, the pre-submission filtering 124 functionality described herein can control the conveyance, submission, and/or storing of messages 120 (e.g., content 122). It should be appreciated that content 122 analysis can be performed in real-time or near real-time. Content 122 analysis can include, but is not limited to, lexical analysis, semantic analysis, contextual analysis, and the like.

Figure 2:
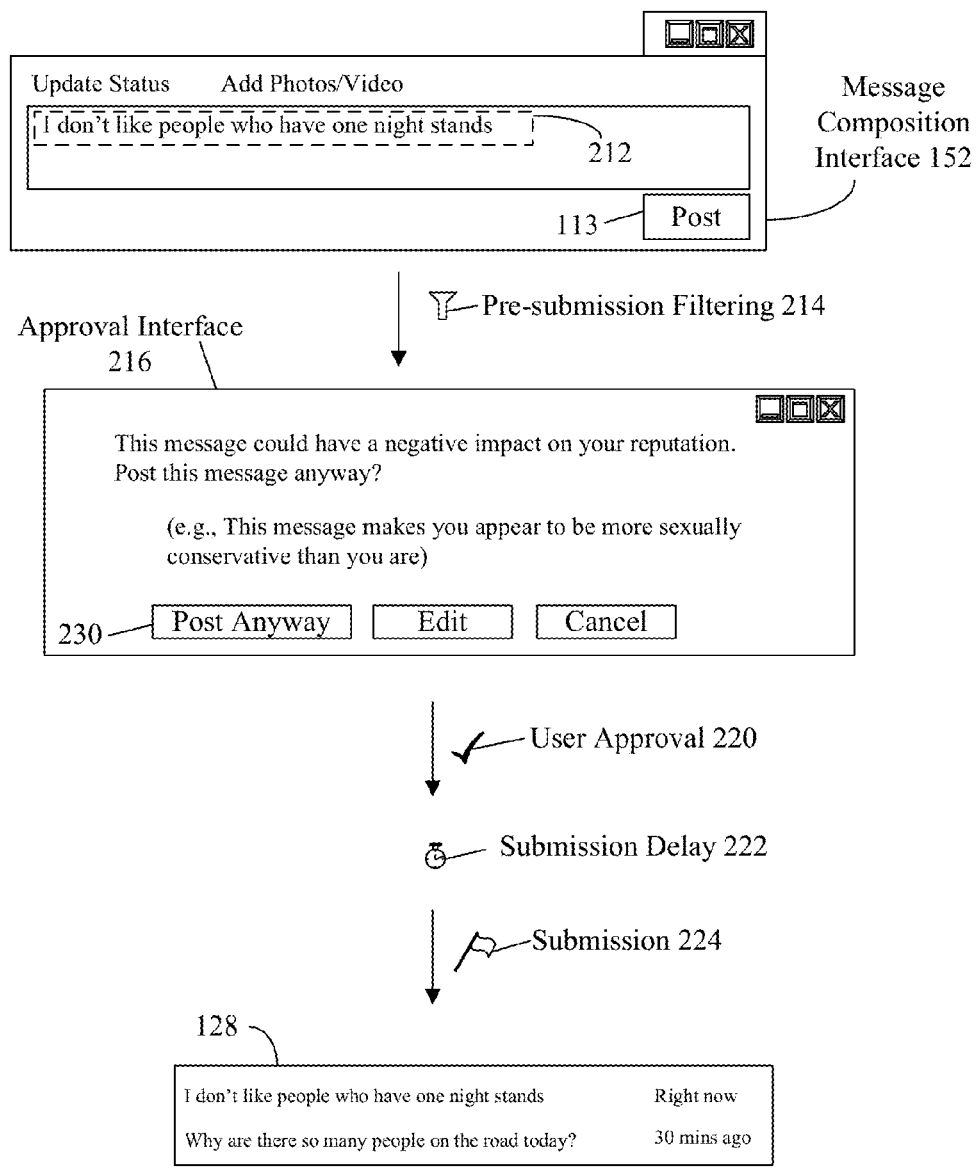
FIG. 2 is a schematic diagram illustrating a scenario for enabling a social networking pre-submission filtering in accordance with an embodiment of the inventive arrangements disclosed herein.

FIG. 2 is a schematic diagram illustrating a scenario 210 for enabling a social networking pre-submission filtering in accordance with an embodiment of the inventive arrangements disclosed herein. Scenario 210 can be present in the context of scenario 110, interface sequence 150, scenario 310, 410, 710, system 500, method 600.

In scenario 210, a content 212 can affect a user's (e.g., 112) reputation resulting in the user appearing to be less promiscuous and/or less sexually liberal than their reputation projects. In one instance, the disclosure can prompt the user to post a more promiscuous and/or sexually liberal variation of the content to fit their reputation.

In one embodiment, content 212 can affect a user's (e.g., 112) reputation resulting in the user appearing to be more promiscuous and/or more sexually liberal than their reputation projects. In the embodiment, the disclosure can prompt the user to post a less promiscuous and/or sexually liberal variation of the content.

In one instance, the disclosure can permit editing of the content resulting in a modified content which can fit with the user's reputation. In the instance, the user can be prompted to utilize the modified content before submitting the modified content.

In scenario 210, a message content 212 can be composed within a message composition interface 152. Message composition interface 152 can include an interface element 113 for submitting content 212 to a social network. Upon selection of element 313, pre-submission filtering 214 can be performed. In one instance, an approval interface 216 can be presented when content 212 conflicts with a user's reputation on a social network. In the instance, approval interface 216 can present a notification which can indicate how the content 212 can affect the user's reputation. For example, the interface 216 can state that content 212 can make the user appear more sexually conservative than their current reputation indicates. Upon user approval 220 (e.g., selection of "Post Anyway" interface element), a submission delay 222 can be enacted. The submission delay 222 can postpone content 212 conveyance to the social network. For example, the delay 222 can result in content 212 being communicated to social network after two hours, allowing a user to reconsider content 212 without unnecessary risk. That is, delay 222 can permit a "grace period" for a user to evaluate content 212 without affecting their reputation. Once delay 222 is expired, submission 224 can be performed, resulting in content 212 being presented within user feed 128.

Drawings presented herein are for illustrative purposes only and should not be construed to limit the invention in any regard. In one embodiment, content 212 submission 224 can be immediate responsive to user approval. In the embodiment, content 212 can be submitted to user feed 128 but the content 212 can remain hidden until delay 222 is expired. In one configuration of the embodiment, "hidden" (e.g., delayed) content can be visible to only the content 212 owner and can be managed until delay 222 is expired. That is, a user can view their feed 128 and hidden content can be presented enabling a user to change his or her mind about whether or not to allow content 212 to be visible within feed 128. It should be appreciated that this hidden functionality can exist when delay 222 is not expired.

In one embodiment, a quarantine functionality can an extension of the functionality of the disclosure. In the embodiment, the quarantine function can permit a specialized message queue (e.g., holding area) to be available to allow pre-submission filtered messages to be reviewed and/or approved prior to submission. In one configuration of the embodiment, the quarantine functionality can be a paid service feature permitting a revenue stream to be generated from the quarantine capability of the disclosure. For example, a subscriber of a social network can pay a monthly service fee to be allowed to access messages which can be potentially embarrassing prior to submission. That is, the functionality can aid users in minimizing negative outcomes from inappropriate messages.

Figure 3:
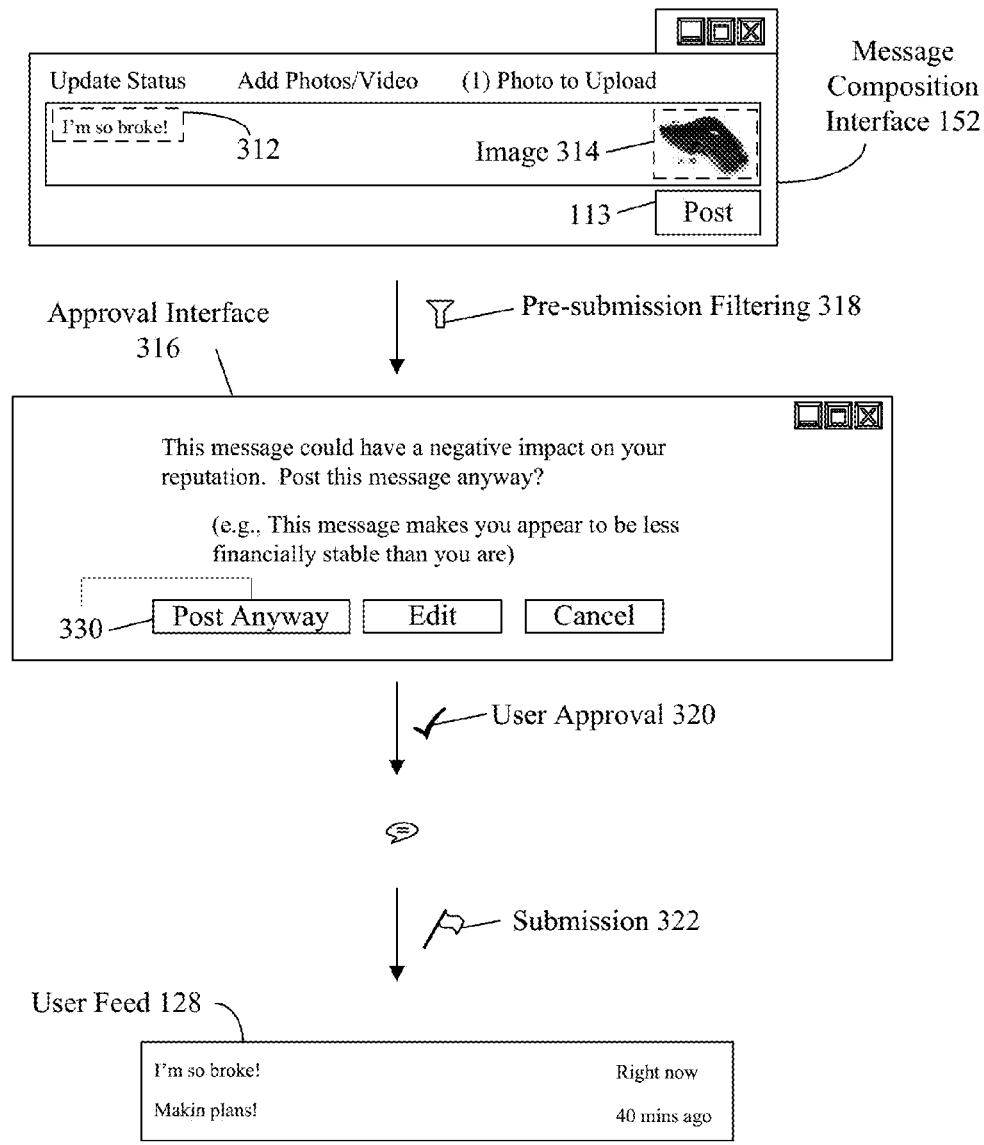
FIG. 3 is a schematic diagram illustrating a scenario for enabling a social networking pre-submission filtering in accordance with an embodiment of the inventive arrangements disclosed herein.

FIG. 3 is a schematic diagram illustrating a scenario 310 for enabling a social networking pre-submission filtering in accordance with an embodiment of the inventive arrangements disclosed herein. Scenario 310 can be present in the context of scenario 110, interface sequence 150, scenario 210, 410, 710, system 500, method 600.

In scenario 310, a message content can be composed within a message composition interface 152. Message content can include a text content 312 and an image content 314. Message composition interface 152 can include an interface element 113 for submitting content 312, 314 to a social network. Upon selection of element 313, pre-submission filtering 318 can be performed. In one instance, an approval interface 316 can be presented when content 312, 314 conflicts with a user's reputation on a social network. In the instance, approval interface 316 can present a notification which can indicate how the content 312, 314 can affect the user's reputation. For example, the interface 316 can state that content 312 can make the user appear less financially stable than their current reputation indicates. Upon user approval 320 (e.g., selection of "Post Anyway" interface element 330), submission 322 can be performed, resulting in content 312, 314 being conveyed to the relevant social network and presented within user feed 128.

Figure 4:
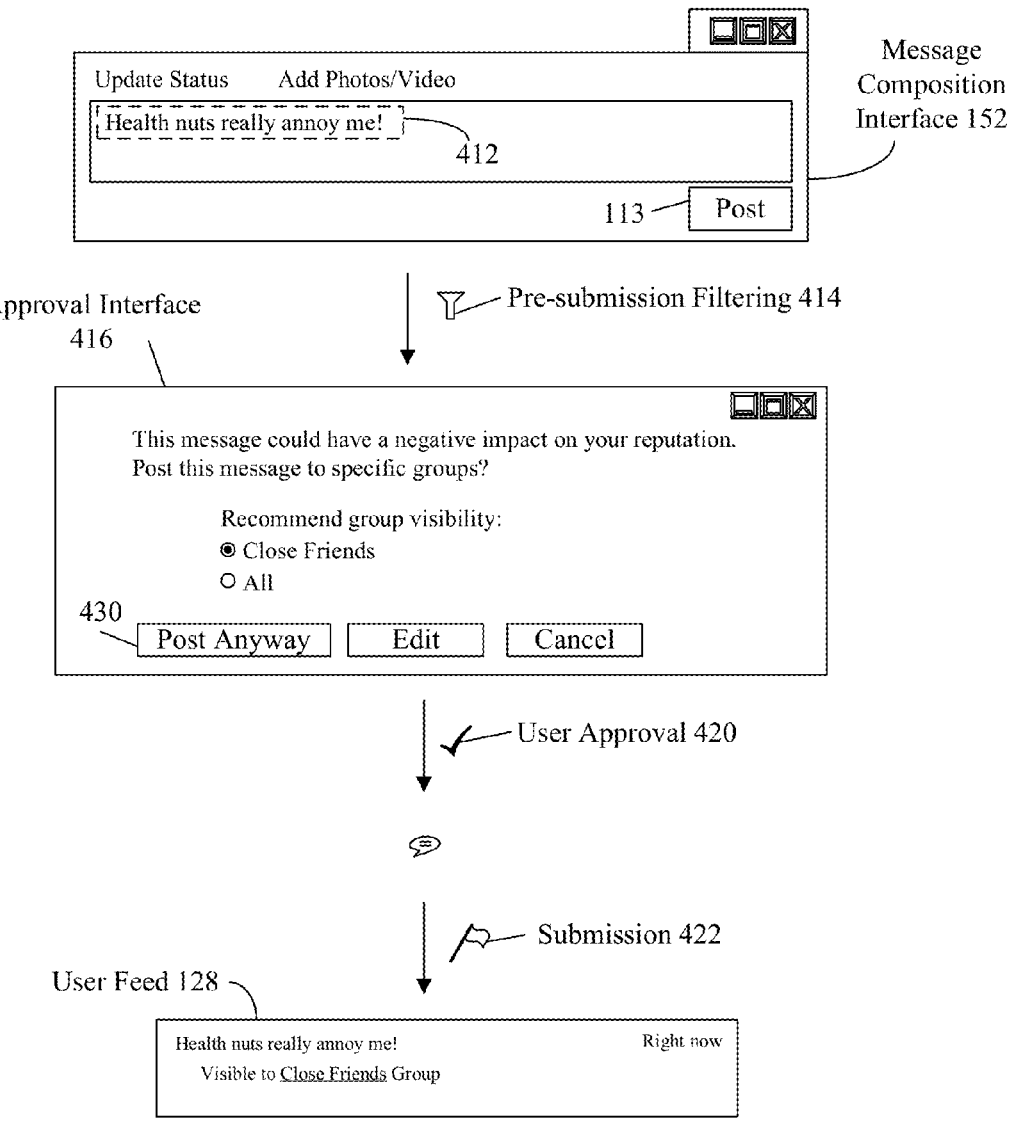
FIG. 4 is a schematic diagram illustrating a scenario for enabling a social networking pre-submission filtering in accordance with an embodiment of the inventive arrangements disclosed herein.

FIG. 4 is a schematic diagram illustrating a scenario 410 for enabling a social networking pre-submission filtering in accordance with an embodiment of the inventive arrangements disclosed herein. Scenario 410 can be present in the context of scenario 110, interface sequence 150, scenario 210, 310, 710, system 500, method 600.

In scenario 410, a message content can be composed within a message composition interface 152. Message content can include a text content 412. Message composition interface 152 can include an interface element 113 for submitting content 412 to a social network. Upon selection of element 313, pre-submission filtering 414 can be performed. In one instance, an approval interface 416 can be presented when content 412 conflicts with a user's reputation on a social network. In the instance, approval interface 416 can present a notification which can permit selective group visibility of the content 412 to one or more groups associated with the user. For example, the interface 416 can allow content 412 to be only visible to a "Close Friends" group on the social network. Upon user approval 420 (e.g., selection of "Post Anyway" interface element 430), submission 422 can be performed, resulting in content 412 being conveyed to the relevant social network and presented within user feed 128 with the selected group setting.

Figure 5:
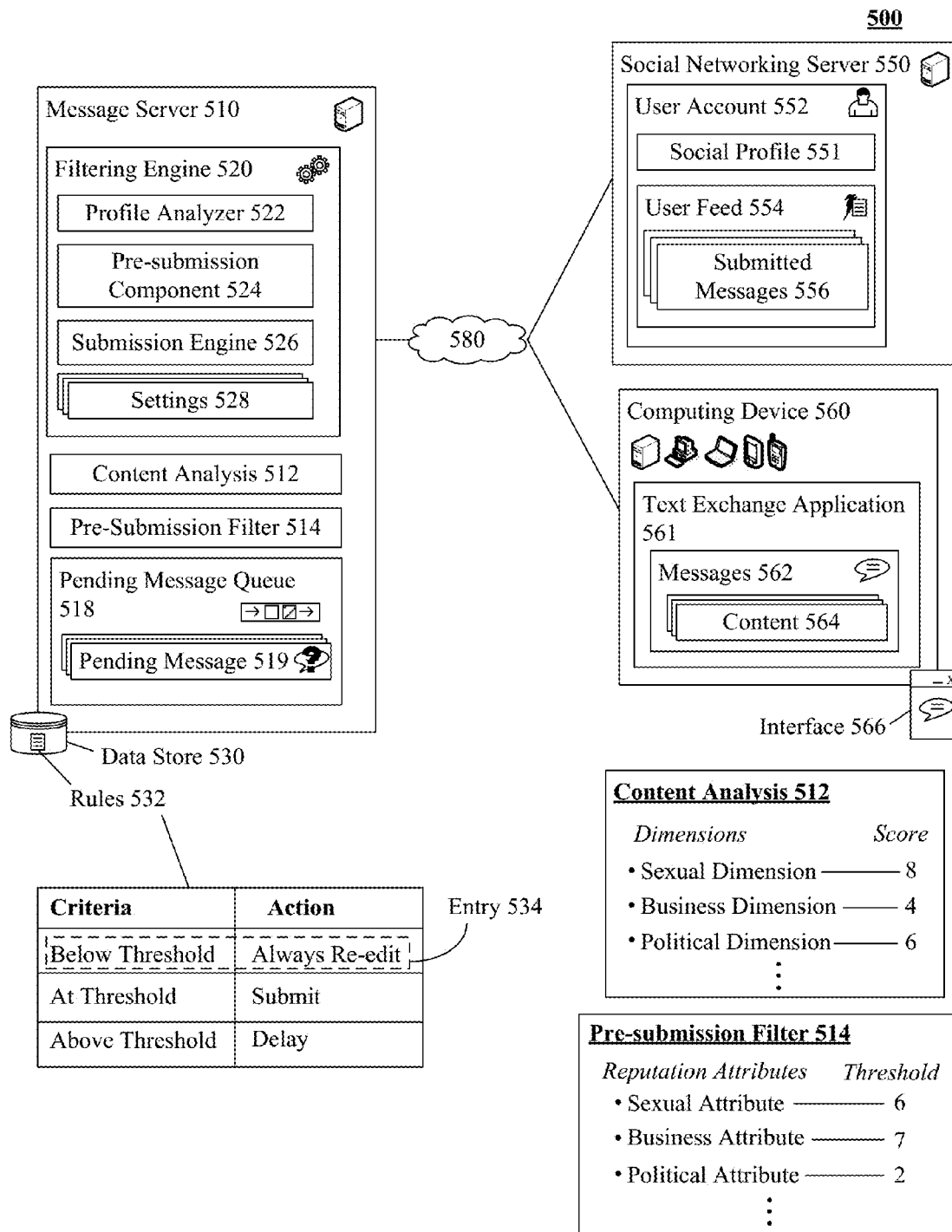
FIG. 5 is a schematic diagram illustrating a system for enabling a social networking pre-submission filtering in accordance with an embodiment of the inventive arrangements disclosed herein.

FIG. 5 is a schematic diagram illustrating a system 500 for enabling a social networking pre-submission filtering in accordance with an embodiment of the inventive arrangements disclosed herein. System 500 can be present in the context of scenario 110, interface sequence 150, scenario 210, 310, 410, 710, and method 600. System 500 components can be communicatively linked via one or more networks 380.

Message server 510 can be a hardware/software entity for executing filtering engine 520. Server 510 functionality can include, but is not limited to, load balancing, encryption, and the like. Server 510 can include, but is not limited to, filtering engine 520, pre-submission filter 514, pending message queue 518, data store 530, and the like. In one instance, message server 510 can be a server associated with social networking server 550.

Filtering engine 520 can be a hardware/software element for performing pre-submission filtering of messages 562. Engine 520 can include, but is not limited to, profile analyzer 522, pre-submission component 524, submission engine 526, settings 528, and the like. Engine 520 functionality can include, but is not limited to, message composition detection, content analysis, and the like. In one instance, engine 520 can be a component of social networking server 550, computing device 560 (e.g., text exchange application 561), and the like. It should be appreciated that engine 520 functionality can be present within an Application Programming Interface, a plug-in software, and the like. In one instance, engine 520 can be present within a proxy server, permitting message filtering prior to transmission to social networking server 550.

Profile analyzer 522 can be a hardware/software entity for enabling reputation based pre-submission filtering. Analyzer 522 functionality can include, but is not limited to, user account 522 selection, feed 544 analysis, social profile 551 analysis, and the like. Analyzer 522 can analyze profile 551 to generate filter 514 which can be utilized to perform pre-submission filtering. In one instance, analyzer 522 can determine one or more reputation attributes and associated thresholds from analysis of social profile 551 and submitted messages 556. It should be appreciated that analyzer 522 can analyze one or more metrics associated with a reputation in an online community.

Pre-submission component 524 can be a hardware/software element for filtering messages 562 prior to message submission. Component 524 functionality can include pre-submission filter 514 generation, content 564 evaluation, rules 532 execution, and the like. In one instance, component 524 can detect submission events (e.g., selection of a Post button), facilitate content approval, enabling pre-submission editing, and the like. In the instance, component 524 can utilize pre-submission filter 514 to perform pre-submission filtering actions. In one embodiment, component 524 can utilize filter 514 to generate content analysis 512. In the embodiment, component 524 can utilize traditional and/or proprietary content analysis mechanisms to generate analysis 512. For example, analysis 512 can be generated from word match. Analysis 512 can include one or more dimensions, a score, and the like. For example, analysis 512 can establish a dimension associated with a political attribute when content 564 includes one or more appropriate words (e.g., democrat, political policy), events, entities (e.g., Congress), and/or people.

Submission engine 526 can be a hardware/software entity for submission of messages 526 and/or message 519. In one instance, engine 526 can utilize a pending message queue 518 to process messages 562. In the instance, queue 518 can persist pending messages 519 which can undergo pre-submission filtering. Engine 526 functionality can include, but is not limited to, protocol mediation, data exchange mediation, and the like.

Settings 528 can be one or more rulesets for establishing the behavior of server 510, engine 520, and/or system 500. Settings 528 can include, but is not limited to, profile analyzer 522 options, pre-submission component 524 settings, submission engine 526 options, and the like. In one instance, settings 528 can include, security policies, authentication settings, filter 514, rules 532, and the like. Setting 528 can be manually and/or automatically determined. In one instance, setting 528 can be configured via interface 566 and/or an interface communicatively linked to server 510.

Pre-submission filter 514 can be a data set representing personal data associated with a specific user. Filter 514 can include, but is not limited to, pre-submission filtering 514 information, pre-submission filtering options (e.g., user preferences), and the like. In one instance, filter 514 can be generated from a reputation information associated with social profile 551. Filter 514 can include, but is not limited to, one or more attributes, a threshold associated with the attribute, and the like. For example, filter 514 can represent a user's reputation via three major aspects, a sexual attribute, a business attribute, and a political attribute each with a numerical score six, seven, and two. In one embodiment, pre-submission filter 514 can include numerical values, fuzzy logic values, and the like. It should be appreciated that filter 514 can include an arbitrary quantity of attributes. That is, filter 514 can represent any facet of a user's reputation.

Pending message queue 518 can be a data structure and/or component for passing control and/or content. Queue 518 can include, but is not limited to, pending message 519, queue control information (e.g., policies, cache), and the like. In one instance, queue 518 can persist messages 562 (e.g., pending messages 519) which are delayed in response to pre-submission filtering 514 and/or user preference. In one instance, pending message 519 can include one or more control information, state information, and the like. For example, message 519 can include timestamp information, delay control information, filter scores, and the like.

Data store 530 can be a hardware/software component able to persist messages 562, filter 514, and the like. Data store 550 can be a Storage Area Network (SAN), Network Attached Storage (NAS), and the like. Data store 550 can conform to a relational database management system (RDBMS), object oriented database management system (OODBMS), and the like. Data store 550 can be communicatively linked to server 310 in one or more traditional and/or proprietary mechanisms. In one instance, data store 550 can be a component of Structured Query Language (SQL) complaint database. In one embodiment, data store 530 can persist pending message queue 518.

Rules 532 can be one or more settings for configuring pre-submission component 524, and/or submission engine 526. Rules 532 can include, but is not limited to, a criteria, an action, and the like. For example, an entry 534 can permit pre-submission component 524 to automatically present a re-editing window in response to an inappropriate content 564. It should be appreciated that rules 532 can be arbitrarily complex.

Social networking server 550 can be a hardware/software entity for executing a social networking platform. Server 550 functionality can include, but is not limited to, data storage, load balancing, Web services, Web site services, and the like. Server 550 can include, but is not limited to, a social networking Web site, a user account 552, a user feed 544, and the like. For example, server 550 can be a server of a GOOGLE+ social networking platform.

User account 552 can be a data set for authentication and/or identification of a user within a social networking Web site. User account 552 can include, but is not limited to, authentication information, social profile 551, user account settings, and the like. Social profile 551 can be one or more data sets associated with a personal profile (e.g., personal interests) of a social networking Web site. For example, profile 551 can include, but is not limited to, sexual orientation, movie tastes, contact information, employment status, and friends (e.g., social networking friends). In one embodiment, social profile 551 can represent a reputation of the user associated with the account. In the embodiment, one or more reputation information data sets (e.g., metrics) can be utilized to represent the reputation of the user. For example, the reputation information can include, but is not limited to, reliability, trustworthiness, compassion, and the like.

In one embodiment, social profile 551 can be associated with a digital identity of a user, a reputation, and the like. For example, social profile 551 can be associated with a MICROSOFT XBOX GAMERTAG or GAMERSCORE profile. In one instance, social profile 551 can include a reputation capital. In the instance, reputation capital can be the quantitative measure of a reputational value of a user in a community. It should be appreciated that the disclosure can leverage site specific reputation metrics including, but not limited to, karma points, kudos, ratings, and the like.

User feed 554 can be a data set associated with user submitted data, user generated content, and the like. Feed 554 can include, but is not limited to, images, video, text (e.g., submitted messages 556), and the like. For example, feed 554 can include photos of a user's memorable life events. Feed 554 can conform to a timeline, news feed, and the like.

Computing device 560 can be a hardware/software permitting the execution of text exchange application 561. Device 560 can include, but is not limited to, input/output components, user settings, interface 566, and the like. Computing device 560 can include, but is not limited to, a desktop computer, a laptop computer, a tablet computing device, a personal digital assistant (PDA), a mobile phone, and the like. Interface 566 can be a user interactive component permitting interaction and/or presentation of user feed 554, message 519, analysis 512, and the like. Interface 566 capabilities can include a graphical user interface (GUI), voice user interface (VUI), mixed-mode interface, and the like. In one instance, interface 566 can be communicatively linked to computing device 360.

Text exchange application 561 can be a software component for composition of messages 562 and/or content 564. Application 561 can include one or more interfaces for composing messages 562, presenting messages, and/or approving messages. In one embodiment, application 561 can be utilized to configure filter 514 and/or rules 523. In one instance, application 561 can be configured to perform a portion of the functionality described within engine 520.

Network 380 can be an electrical and/or computer network connecting one or more system 300 components. Network 380 can include, but is not limited to, twisted pair cabling, optical fiber, coaxial cable, and the like. Network 380 can include any combination of wired and/or wireless components. Network 380 topologies can include, but is not limited to, bus, star, mesh, and the like. Network 380 types can include, but is not limited to, Local Area Network (LAN), Wide Area Network (WAN), Virtual Private Network (VPN) and the like.

Drawings presented herein are for illustrative purposes only and should not be construed to limit the invention in any regard. It should be appreciated that runtime engine 324 can be an optional component of engine 320. It should be appreciated that one or more components within system 300 can be optional components permitting that the disclosure functionality be retained. It should be understood that engine 320 components can be optional components providing that engine 320 functionality is maintained. It should be appreciated that one or more components of engine 320 can be combined and/or separated based on functionality, usage, and the like. System 300 can conform to a Service Oriented Architecture (SOA), Representational State Transfer (REST) architecture, and the like.

Figure 6:
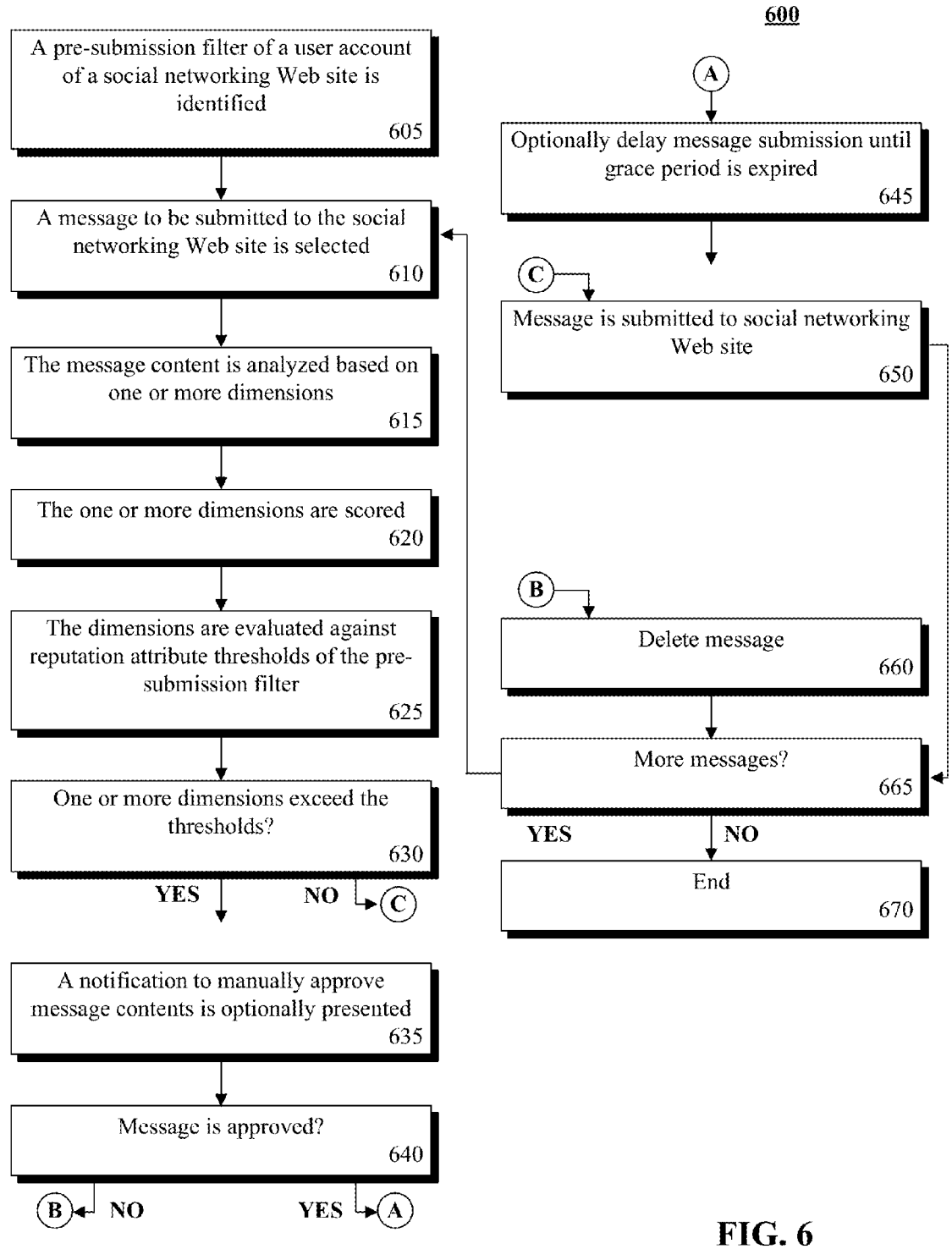
FIG. 6 is a schematic diagram illustrating a method for enabling a social networking pre-submission filtering in accordance with an embodiment of the inventive arrangements disclosed herein.

FIG. 6 is a schematic diagram illustrating a method 600 for enabling a social networking pre-submission filtering in accordance with an embodiment of the inventive arrangements disclosed herein. Method 600 can be present in the context of scenario 110, interface sequence 150, scenario 210, 310, 410, 710, and system 500.

In step 605, a pre-submission filter of a user account of a social networking Web site can be identified. In step 610, a message to be submitted to the social networking Web site can be selected. In step 615, the message content can be analyzed based on one or more dimensions. In step 620, the one or more dimensions can be scored. In step 625 the dimensions can be evaluated against reputation attribute thresholds of the pre-submission filter. In step 630, if one or more dimensions exceed the corresponding attribute threshold, the method can continue to step 650.

In step 634, a notification to manually approve the message contents can be optionally presented. In step 640, if the message is approved the method can proceed to step 645. In step 645, the message submission can be optionally delayed until a grace period is expired. It should be appreciated that grace period can be a dynamic duration which can change in response to one or more factors including, but not limited to, time of day, quantity of historic texts (e.g., texts per hour/min), and the like. In step 540, the message can be submitted to the social networking Web site. In step 660, the message can be deleted. In step 665, if there are more messages, the method can return to step 610, else continue to step 670.

Figure 7:
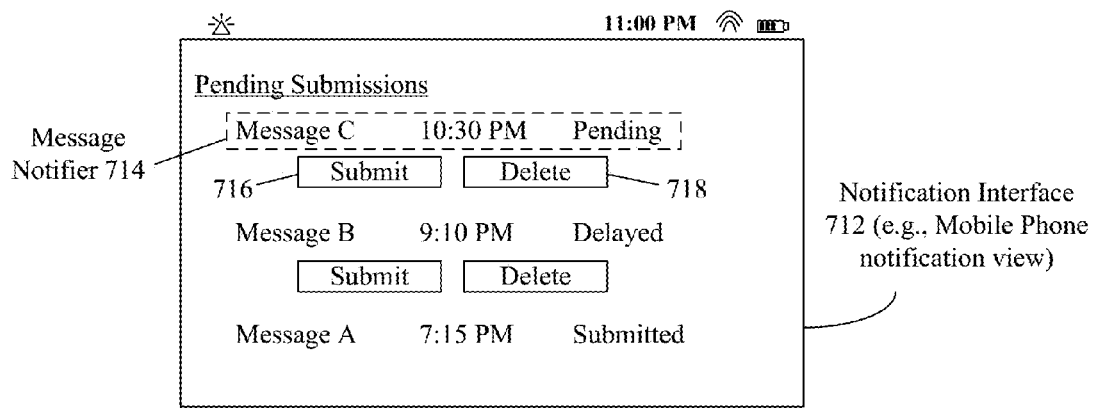
FIG. 7 is a schematic diagram illustrating a scenario for a set of interfaces for enabling a social networking pre-submission filtering in accordance with an embodiment of the inventive arrangements disclosed herein.
Figure 7:
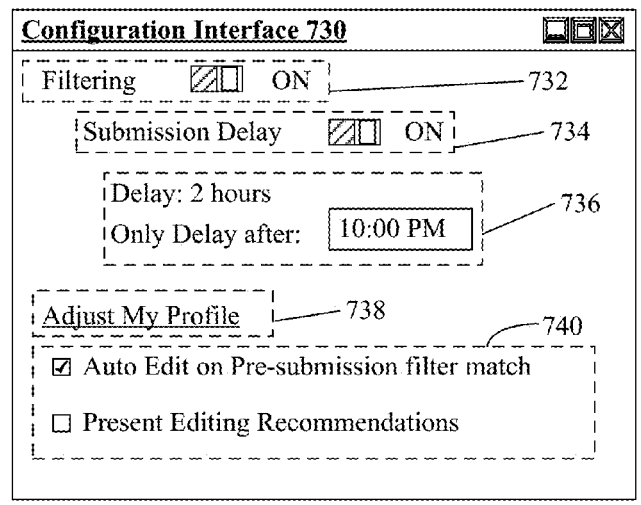

FIG. 7 is a schematic diagram illustrating a scenario 710 for a set of interfaces for enabling a social networking pre-submission filtering in accordance with an embodiment of the inventive arrangements disclosed herein. Scenario 710 can be present in the context of scenario 110, interface sequence 150, scenario 210, 310, 410, system 500, and method 600.

Scenario 710 can illustrate a notification interface 712 of a mobile phone screen for viewing pending messages associated with pre-submission filtering. Notification 712 can include a message notifier 714 and/or action elements 716, 718 which can enable control of pending messages. For example, message notifier 714 can show a preview of a pending message (e.g., Message C), the timestamp (e.g., 10:30 PM), and the status (e.g., Pending). In one embodiment, interface 712 can permit action elements 716, 718 to manage pending messages. In the embodiment, action elements 716, 718 can allow a user to manually approve a pending message resulting in submission and/or delete a pending message resulting in message deletion.

Scenario 710 can illustrate a configuration interface 730 which can permit the customization of pre-submission filtering. Interface 730 can include option 732, 734, 736, 738, and/or 740. In option 732, pre-submission filtering can be activated or deactivated resulting in the subsequent of activation or deactivation of options 734-740. Option 734 can be configured to enable or disable a submission delay (e.g., grace period) associated with pre-submission filtering submission. In option 736, submission delay configuration settings can be presented. Settings can include, but is not limited to, delay duration, delay interval, and the like. For example, settings can permit submission delay to occur only when the message is submitted after 10:00 PM. In option 738, profile adjustment can be performed. In one instance, profile adjustment can be manually and/or automatically performed. For example, if a user wants to change their reputation based on historic text messages, option 738 can trigger the automatic adjustment of a pre-submission filter. In option 740, editing configuration settings can be presented. Editing configuration settings can include, but is not limited to, automatically presenting an editing interface, presenting editing recommendations, and the like. In one instance, editing recommendations can include word substitution suggestions, topic recommendations, and the like.

Drawings presented herein are for illustrative purposes only and should not be construed to limit the invention in any regard. It should be appreciated that the disclosure can be associated with additional interfaces including, but not limited to, a content adjustment interface (e.g., image replacement), a pre-submission message history (e.g., unsent messages, original messages), and the like.

Figure 8:
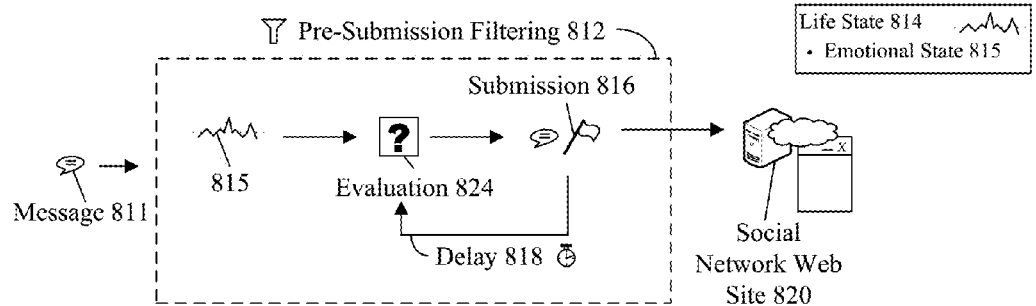
FIG. 8 is a schematic diagram illustrating a set of scenarios for a set of interfaces for enabling a social networking pre-submission filtering in accordance with an embodiment of the inventive arrangements disclosed herein.
Figure 8:
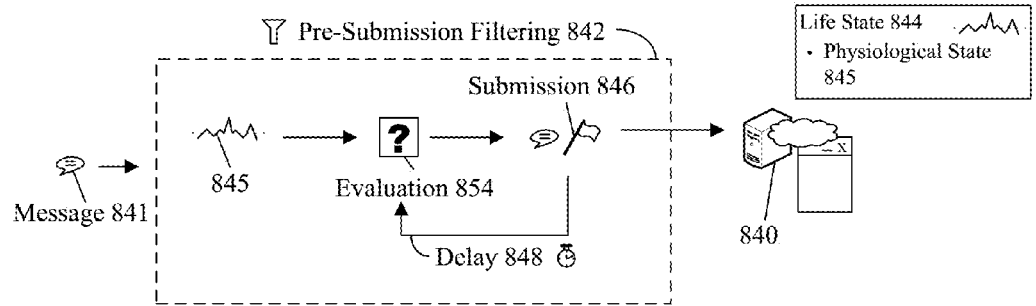
Figure 8:
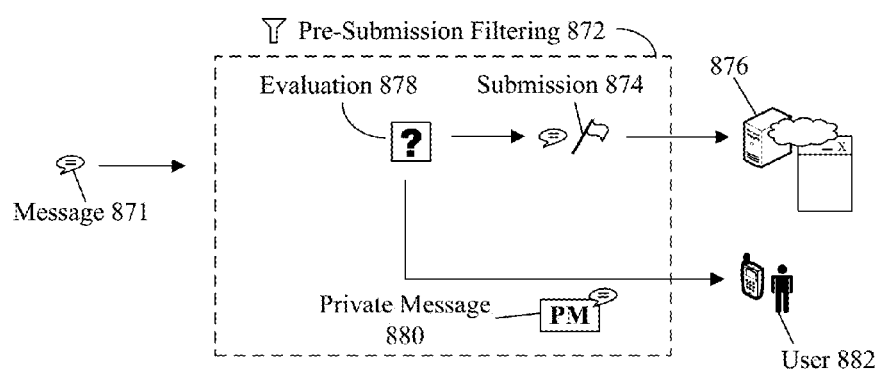

FIG. 8 is a schematic diagram illustrating a set of scenarios for a set of interfaces for enabling a social networking pre-submission filtering in accordance with an embodiment of the inventive arrangements disclosed herein. Scenario 810, 840, 870 can be present in the context of scenario 110, interface sequence 150, scenario 210, 310, 410, 710, system 500, and method 600. In scenario 810, 840, pre-submission filtering of a text exchange message can be performed based on a life state attribute. It should be appreciated that the pre-submission filtering scenario is not limited to a single life state attribute and can be arbitrarily complex.

In scenario 810, pre-submission filtering 812 of a text exchange message 811 can be performed based on a life state 814 attribute 815. For example, filtering 812 can be performed based on the emotional state of a user composing message 811. In the scenario, emotional state 815 can be obtained from one or more sources including, but not limited to, voice analysis, facial analysis, behavioral biometric analysis, and the like. For example, emotional state 815 can be determined based on a user's tone when composing message 811 via speech to text composition. In filtering 812, evaluation 824 can assess one or more threshold criteria associated with an emotional state 815 of a user. When a threshold for delaying a message is met, the message can be delayed 818. For example, when state 815 is determined to be angry, the submission 816 can be delayed 818 until the state 815 changes. When the threshold for submitting a message is met, the message can be submitted via submission 816 action. Submission 816 can result in message 811 being presented in social network Web site 820 (e.g., user feed).

In scenario 840, pre-submission filtering 842 of a text exchange message 841 can be performed based on a life state 844 attribute 845. For example, filtering 842 can be performed based on the physiological state of a user composing message 811. In the scenario, physiological state 845 can be obtained from one or more sources including, but not limited to, heart rate, blood pressure, and the like. For example, physiological state 845 can be determined from a smart watch worn by a user during message 841 composition. In filtering 842, evaluation 854 can assess one or more threshold criteria associated with an physiological state 845 of a user. When a threshold for delaying a message is met, the message can be delayed 848. For example, when state 845 is determined to be inebriated, the submission 846 can be delayed 848 until the state 845 changes. When the threshold for submitting a message is met, the message can be submitted via submission 846 action. Submission 846 can result in message 841 being presented in social network Web site 840 (e.g., user feed).

In scenario 870, pre-submission filtering 872 of a text exchange message 871 can provide one or more alternative communication mechanisms for message 871. In one instance, when evaluation 878 determines message 871 exceeds a filter score, a recommendation for a private message 880 communication can be presented. In the instance, a user can manually and/or automatically approve private message 880 communication which can result in message 880 being communicated to user 882. That is, submission 874 is not performed. In one embodiment, when evaluation 878 determines message 871 conforms to a reputation of a user, the message 871 can be submitted via submission 874 action to social network Web site 876.

Figure 9:
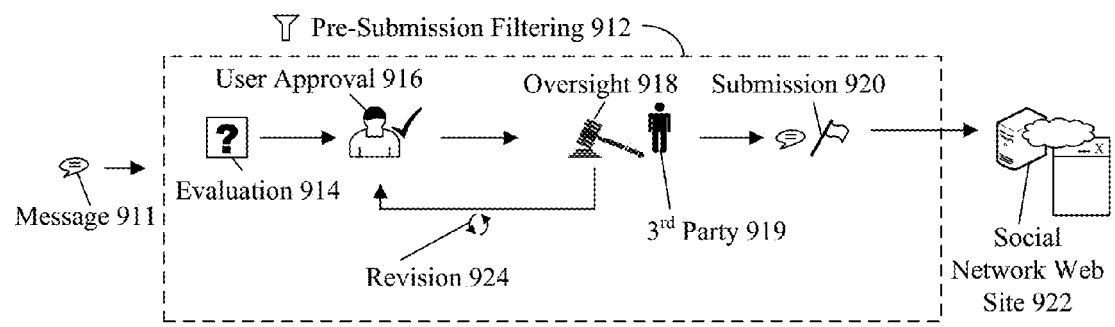
FIG. 9 is a schematic diagram illustrating a scenario for a set of interfaces for enabling a social networking pre-submission filtering in accordance with an embodiment of the inventive arrangements disclosed herein.

FIG. 9 is a schematic diagram illustrating a scenario for a set of interfaces for enabling a social networking pre-submission filtering in accordance with an embodiment of the inventive arrangements disclosed herein. Scenario 910 can be performed in the context of scenario 110, interface sequence 150, scenario 210, 310, 410, 710, 810, 840, 870, system 500, and method 600.

In scenario 910, pre-submission filtering 912 can permit an oversight 918 of a message 911 by a 3rd party 919. In filtering 912, evaluation 914 of message 911 can be performed. Evaluation 914 can conform to one or more functionalities described herein. Upon user approval 916, message 911 can be conveyed to a third party 919 for sanctioning. For example, a message 911 composed by a minor can be conveyed to a parent (e.g., or guardian) for approval before submission 920 can occur. In one instance, a notification of message 911 can be conveyed to party 919. In the instance, the notification can present the message 911 and provide a mechanisms for approval and/or rejection. Upon approval by party 919, submission 920 can be performed resulting in message 911 inclusion within social network Web site 922. In one instance, when party 919 rejects message 911, the message 911 can be conveyed to the composing user for revision 924. The flow can repeat until party 919 approves message 911.

The flowchart and block diagrams in the FIGS. 1-9 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method a pre-submission content filtering comprising:
   establishing, within a non-transitory storage medium, a social profile for a social networking account of a person, where the social profile represents a reputation of the person, wherein the social profile defines characteristics of an online reputation for the person and quantifies the characteristics in a plurality of defined dimensions, wherein for each dimension a threshold range is established for the profile based on the quantified characteristics;
   receiving, at a computing device comprising hardware, a content for a message posted by the person to be submitted to a social networking account of the person, wherein once the message is submitted, the received content is shared with other persons accessing postings of the social networking account of the person via the social network;
   prior to the computing device submitting the content to the social networking account for access by the other persons, scoring, by the computing device, the content of the message in the plurality of the defined dimensions;
   responsive to a determination that the scores of the content in each of the plurality of defined dimensions is within the respective threshold ranges established within social profile for the corresponding ones of the defined dimensions, the computing device taking a programmatic action to ensure the submission of the message to the social networking account completes at a first time so that the other persons are thereafter able to read the message by accessing the social networking account of the person; and
   responsive to a determination that at least one of the scores in at least one of the plurality of defined dimensions is outside the respective threshold range established within social profile for the corresponding one of the defined dimensions, the computing device taking a programmatic action to ensure the submission of the message to the social networking account does not occur at or before the first time.

2. The method of claim 1, wherein one of the plurality of dimensions represents a sexual reputation of the person.

3. The method of claim 1,
wherein the programmatic action taken responsive to a determination that at least one of the scores is outside the respective threshold range, is to notify the person via a user interface that the content of the message exceeds the respective threshold range, wherein the user interface thereafter provides options to submit the message anyways.

4. The method of claim 1,
wherein the programmatic action taken responsive to a determination that at least one of the scores is outside the respective threshold range, is to notify the person via a user interface that the content of the message exceeds the respective threshold range, wherein the user interface thereafter provides an options to manually edit the message.

5. The method of claim 1, wherein the programmatic action taken responsive to a determination that at least one of the scores is outside the respective threshold range, is to modify the content resulting in a score for the content as modified being within the respective threshold range, wherein the content as modified is submitted.

6. The method of claim 1, wherein the programmatic action taken responsive to a determination that at least one of the scores is outside the respective threshold range, is to delay the submission of the content for at least a period of time after the first time.

7. The method of claim 1, wherein the person is a minor, wherein the threshold ranges or profile defined characteristics resulting in the threshold ranges are established by a parent or guardian of the minor, thereby preventing the minor from posting messages to the social networking account when the messages have scores inconsistent with the threshold ranges.

8. The method of claim 1, wherein the person is famous, wherein the threshold ranges or profile defined characteristics resulting in the threshold ranges are established by an agent of the famous person, thereby preventing the person from posting messages to the social networking account when the messages have scores inconsistent with the threshold ranges.

9. The method of claim 1, wherein scores for each of the dimensions are shown within a user interface to the person before the message is submitted to the social networking account.

10. The method of claim 1, wherein scores for each of the messages are utilized as a filter to determine whether subgroups of people are granted access to view the message, wherein different subgroups are established for different sets of the other persons, such that only a subset of the different subgroups are permitted to view sets of different messages posted to the social network account based on the scores.

11. The method of claim 1, wherein a user interface prompts the person based on a value of the scores to establish restrictions of the message against one or more groups that otherwise would be able to view the message.

12. The method of claim 1, wherein different group-specific restrictions are automatically determined based on the scores for the different dimensions and based on characteristics defined in the profile.

13. The method of claim 1, wherein one of the plurality of dimensions represents a physical health of the person.

14. The method of claim 1, wherein the scores and threshold ranges are a feature of a third party service provided via an entity not directly affiliated with a social networking site that maintains the social networking account.

15. The method of claim 1, wherein the scores and threshold ranges are a feature of a client side application that filters information before being posted to the social networking Web site.

16. The method of claim 1, wherein one of the plurality of dimensions represents a financial reputation of the person.

17. The method of claim 1, wherein one of the plurality of dimensions represents an emotional reputation of the person.

18. The method of claim 1, wherein one of the plurality of dimensions represents a political reputation of the person.

19. A system for pre-submission filtering comprising:
a processor for executing programmatic instructions;
a non-transitory storage medium for storing the programmatic instructions, wherein execution of the programmatic instructions by the processor results in a machine:
establishing, within a non-transitory storage medium, a social profile for a social networking account of a person, where the social profile represents a reputation of the person, wherein the social profile defines characteristics of an online reputation for the person and quantifies the characteristics in a plurality of defined dimensions, wherein for each dimension a threshold range is established for the profile based on the quantified characteristics;
receiving a content for a message posted by the person to be submitted to a social networking account of the person, wherein once the message is submitted, the received content is shared with other persons accessing postings of the social networking account of the person via the social network;
prior to submitting the content to the social networking account for access by the other persons, scoring the content of the message in the plurality of the defined dimensions;
responsive to a determination that the scores of the content in each of the plurality of defined dimensions is within the respective threshold ranges established within social profile for the corresponding ones of the defined dimensions, taking a programmatic action to ensure the submission of the message to the social networking account completes at a first time so that the other persons are thereafter able to read the message by accessing the social networking account of the person; and
responsive to a determination that at least one of the scores in at least one of the plurality of defined dimensions is outside the respective threshold range established within social profile for the corresponding one of the defined dimensions, taking a programmatic action to ensure the submission of the message to the social networking account does not occur at or before the first time.

20. A storage medium comprising programmatic instructions able to be executed by a processor of the machine to:
establish, within a non-transitory storage medium, a social profile for a social networking account of a person, where the social profile represents a reputation of the person, wherein the social profile defines characteristics of an online reputation for the person and quantifies the characteristics in a plurality of defined dimensions, wherein for each dimension a threshold range is established for the profile based on the quantified characteristics;
receive a content for a message posted by the person to be submitted to a social networking account of the person, wherein once the message is submitted, the received content is shared with other persons accessing postings of the social networking account of the person via the social network;

prior to submitting the content to the social networking account for access by the other persons, score the content of the message in the plurality of the defined dimensions;

responsive to a determination that the scores of the content in each of the plurality of defined dimensions is within the respective threshold ranges established within social profile for the corresponding ones of the defined dimensions, take a programmatic action to ensure the submission of the message to the social networking account completes at a first time so that the other persons are thereafter able to read the message by accessing the social networking account of the person; and responsive to a determination that at least one of the scores in at least one of the plurality of defined dimensions is outside the respective threshold range established within social profile for the corresponding one of the defined dimensions, take a programmatic action to ensure the submission of the message to the social networking account does not occur at or before the first time.

\* \* \* \* \*